UNITED STATES PATENT OFFICE.

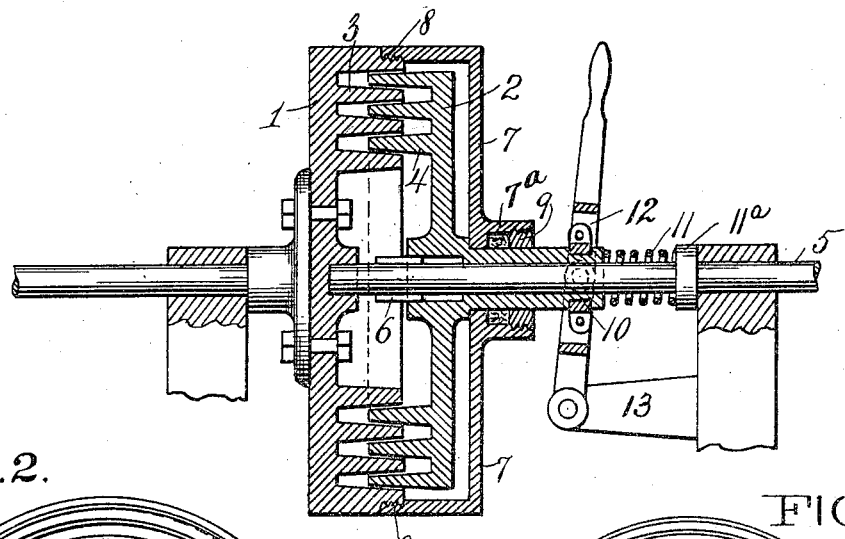
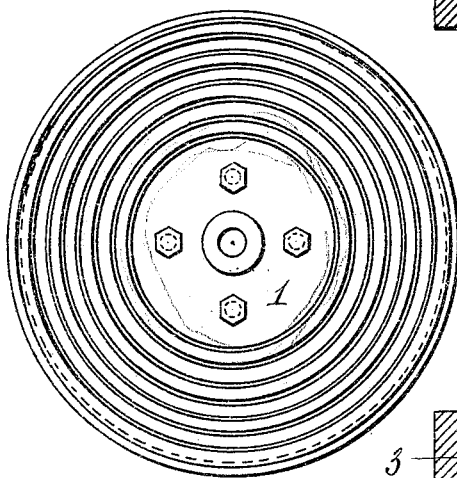
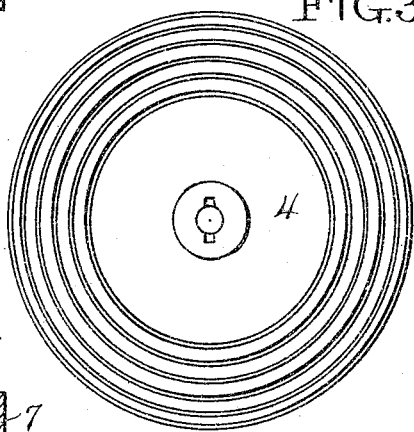
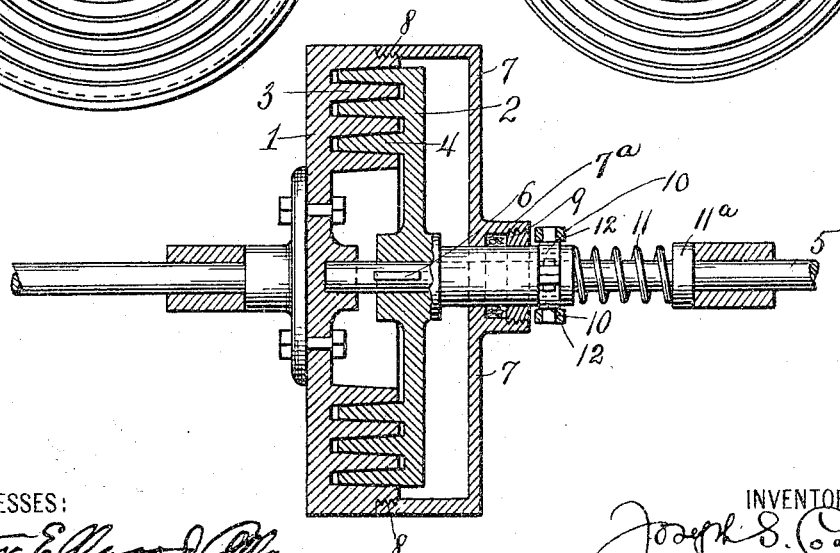

JOSEPH S. COATES, OF GOSHEN, NEW YORK.

CLUTCH.

950,164.   Specification of Letters Patent.   Patented Feb. 22, 1910.

Application filed April 21, 1908. Serial No. 428,362.

*To all whom it may concern:*

Be it known that I, JOSEPH S. COATES, a citizen of the United States of America, residing at Goshen, in the county of Orange and State of New York, have invented certain new and useful Improvements in Clutches, of which the following is a specification.

My invention relates to an improved clutch which is intended primarily to be utilized upon automobiles or motor vehicles. The object which I have sought to attain being the providing of a clutch which will gradually take hold but which will instantly release, and which will operate when in its locked position with such strength and firmness as to provide a satisfactory device in this respect, and one which will entirely do away with the annoyance of frequent necessary adjustments.

I provide what I term herein a double series of conical rings placed in operable proximity to one another and which by reason of their complementary structure and furthermore, by reason of the fact that both sets turn on a common center, result when brought into contact, in a perfect frictional joinder between all the complementary faces or parts. Such an arrangement, broadly speaking, provides as aforesaid, a perfect clutch or lock and any tendencies to irregularities or imperfections of any face or part of a face will be offset and removed by the grinding tendency of the opposed part, thus constantly wearing evenly and preserving the original perfect engagement. In other words the two members of the clutch will respectively operate each with the other to keep the opposed surfaces true.

In order to explain my invention more specifically I will describe it in connection with the accompanying drawings which form a part of the specification and in which—

Figure 1 is an axial section of my improved clutch showing the clutch open. Fig. 2 is a face view of the inner or fixed member of the clutch. Fig. 3 is a face view of the outer or movable member of the clutch. Fig. 4 is an axial section of the clutch showing the clutch closed.

In these drawings 1, represents the inner fixed revolving member bolted to the shaft and becoming a part of the fly-wheel. 2, is the other outer or movable member of the clutch. These members 1 and 2 have a concentric series of intermeshing rings, parts or projections 3 and 4, which parts or projections extend from the parts 1 and 2 respectively, and which gradually diminish in cross section from their bases toward their outer ends. In other words the parts 3 and 4 are cone-shaped and the slanting faces of each are adapted to bear against the complementary faces of the other member.

5 is a shaft suitably supported at its outer end in a socket formed in the hub of the member 1, and 6, is a key which projects across the shaft into key grooves in the hub of the member 2 and which locks the member 2 to the shaft, but which permits the said member 2 to slide longitudinally on the said shaft.

7, is a cover having a stuffing box $7^a$ and fastened by a screw threaded connection at 8 to the member 1; the said member 1, and the said cover 7 constituting when so joined, an oiltight compartment. I provide also a gland 9, within the stuffing box provided with suitable packing which prevents the escape of the oil along the shaft when the parts are in operation.

At 10 I show a loose split collar arranged on and recessed into the reduced hub extension of the member 2, and which is adapted through suitable lever 12 hinged to an arm 13 and pivoted to the split collar 10 to shift the member 2, backward and disengage the clutch members; a spring 11, being provided to keep the members normally in contact. This spring is coiled around the shaft 5 between the end of the hub extension and a collar $11^a$.

The rings 3 and 4 may be in any number desired and I may increase them or decrease them as the particular form of clutch requires without departing from the spirit of my invention. I also may make the beveled faces of the rings at any desired angle; as some forms of clutch may require one degree of slant in this respect, and other forms a lesser or greater degree of slant. It will be seen that the coördinating faces of the rings gradually diminish in diameter from the outer ring to the inner ring, which while it provides holding faces with different leverages, yet at the same time is able to assimilate and absorb such leverages and reduce them to a single force by reason of the fact that all the parts are working on a common center. It will also be seen that each member with its rings is complementary in form and shape to its opposed member and that each will operate as a truing instrument to the other at all times. It will also be seen that by reason of the beveled faces and the wedging principle on which they act, a sure clutch can be secured and that the members can be quickly disassociated; in engaging a clutch for automobile purposes, it is very desirable that one member should not immediately and completely grip the corresponding member, as such action causes a sudden jerking of the car; and it is therefore desirable that there should be a slipping and gradual increase of friction until the load is gently started. In this latter respect this clutch would be very perfect owing to the gradual squeezing out of the oil between the surfaces of the rings. In becoming disengaged, the reverse of the foregoing is true and it will be seen that an instantaneous disengagement can be effected, whereas in multiple disk clutches as now employed, springs are depended upon for effecting the disengagement of the clutch members; it often happens that these springs do not work promptly enough to immediately overcome the suction between the disks and this causes the clutch to "drag" and to continue to turn the shaft which should have been instantly released. It will also be seen that, the clutch properly constructed will be one of great simplicity, strength, and endurance; and one also not likely to get out of order. The multiple cone shape rings approaching, or receding from, each other and working on a common center, require a controlling device of no very great power in itself; any proper controlling device can be utilized in connection with this clutch. It will also be observed that in my invention the entire clutch or holding faces are slanting or beveled and in all contact faces or surfaces I employ the wedge principle and that only.

Having thus described my invention, the following is what I claim as new therein and desire to secure by Letters Patent.

The combination of the inner fixed member having a hub formed with a socket, and a series of cone shaped concentric rings, a shaft having its outer end inserted in the hub-socket and a key projecting across the shaft, an outer movable member having a hub formed with key grooves, a reduced hub-extension provided with a collar recess, and a series of cone shaped concentric rings intermeshing with the concentric rings of the inner fixed member, a cover formed with a stuffing box and mounted on the reduced hub-extension and incasing the outer movable member, and fitted to the inner fixed member, a gland within the stuffing box, a loose split collar located in the collar recess, a shaft collar, a spring coiled around the shaft between the hub-extension and the shaft collar, and a lever pivoted to the split collar.

JOSEPH S. COATES.

Witnesses:
HERBERT KNIGHT,
JAMES JOHNSON.